United States Patent
Ionescu

(10) Patent No.: US 8,922,935 B1
(45) Date of Patent: Dec. 30, 2014

(54) FIRST AND SECOND READ SENSORS COUPLED TO A PREAMPLIFIER VIA A COMMON SIGNAL LINE

(71) Applicant: Seagate Technology LLC, Cupertino, CA (US)

(72) Inventor: Stefan Ionescu, Burnsville, MN (US)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 14/012,297

(22) Filed: Aug. 28, 2013

(51) Int. Cl.
*G11B 5/02* (2006.01)
*G11B 20/10* (2006.01)

(52) U.S. Cl.
CPC .................. *G11B 20/10351* (2013.01)
USPC .......................................................... 360/67

(58) Field of Classification Search
CPC .. G11B 5/3961; G11B 5/3964; G11B 5/3951; G11B 5/3958
See application file for complete search history.

(56) References Cited

U.S. PATENT DOCUMENTS

| | | | |
|---|---|---|---|
| 3,979,775 A * | 9/1976 | Schwarz | 360/315 |
| 5,412,518 A | 5/1995 | Christner et al. | |
| 2005/0105219 A1* | 5/2005 | Mao et al. | 360/315 |
| 2007/0030594 A1* | 2/2007 | Biskeborn et al. | 360/129 |

FOREIGN PATENT DOCUMENTS

EP 2410528 1/2012

OTHER PUBLICATIONS

Wood, Roger; "Shingled Magnetic Recording and Two-Dimensional Magnetic Recording"; Oct. 19, 2010; Hitachi Global Storage Technologies; 17-47.*

* cited by examiner

*Primary Examiner* — Daniell L Negron
(74) *Attorney, Agent, or Firm* — Hollingsworth Davis, LLC

(57) ABSTRACT

First and second read sensors are coupled in series to a preamplifier via respective first and second signal lines and a common signal line between the first and second read sensors. Independent first and second currents are supplied to the respective first and second read sensors. The first and second currents are varied to maintain respective first and second fixed bias values (e.g., fixed voltage or fixed current) on the first and second read sensors.

18 Claims, 8 Drawing Sheets

FIRST AND SECOND READ SENSORS COUPLED TO A PREAMPLIFIER VIA A COMMON SIGNAL LINE

SUMMARY

The present disclosure is related to first and second read sensors that are coupled to a preamplifier via a common current line. In one embodiment, first and second read sensors are coupled in series to a preamplifier via respective first and second signal lines and a common signal line between the first and second read sensors. Independent first and second currents are supplied to the respective first and second read sensors. The first and second currents are varied to maintain respective first and second fixed bias values (e.g., fixed voltage or fixed current) on the first and second read sensors. For example, the currents may be varied to maintain a fixed bias value regardless of a mismatch in sensor resistance, and such that the common mode of each sensor is maintained at a predetermined reference value.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The drawings are not necessarily to scale.

DETAILED DESCRIPTION

Figure 1:
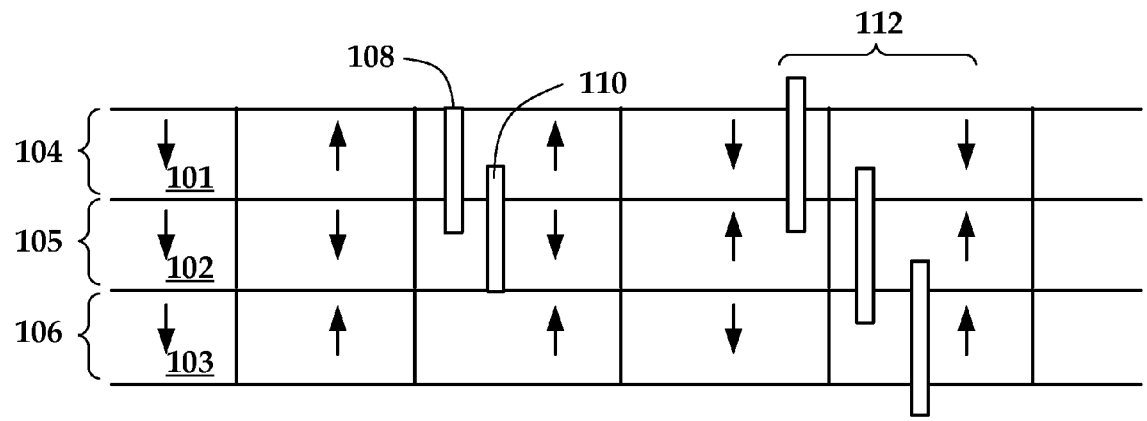
FIG. 1 is a block diagram illustrating reading of two-dimensional data tracks according to an example embodiment.

The present disclosure is related to systems, methods, and apparatuses utilizing magnetic readers with multiple read sensors. The theoretical maximum areal density of current magnetic recording architectures (e.g., perpendicular recording) is bounded by what is known as the superparamagnetic limit. The superparamagnetic limit relates to the tendency of magnetic grains to randomly flip magnetic orientation in response to thermal fluctuations, and defines a lower bound on the area in which an individual bit can be reliably stored In order to address the superparamagnetic limit, technologies such as heat assisted magnetic recording (HAMR) and bit patterned media (BPM) are being developed to increase areal density beyond what is current possible with perpendicular architectures. A HAMR recording device uses an energy source such as a laser to heat a spot on a high coercivity medium to locally reduce coercivity during recording. A BPM device has a media that is patterned via nanolithography to form magnetic cells used to store bits of data. Both HAMR and BPM may require advances in media and read/write head design, and are currently considered relatively long-range solutions to increase storage capacity.

For this reason, the industry is looking to increase areal density with existing technology until newer technologies can be established. For example, a technique known as shingled recording utilizes drive architectures different from the ones in use today, but may be implemented using existing perpendicular media and conventional (e.g., non-HAMR) read-write heads.

Shingled recording involves writing tracks that overlap part of previously written tracks. The write head includes features such as high field strength and sharp corner-edge field that can result in narrower tracks. However, existing read transducers may have difficulty reading back these narrower tracks. For example, shrinking the read transducers in a cross-track direction may decrease signal-to-noise ratio. As a result, two-dimensional magnetic recording (TDMR) is proposed to facilitate reading back data from narrower tracks with a read transducer that is wider than the tracks.

Conventional magnetic recording is sometimes categorized as a one-dimensional (1-D) architecture, even though a magnetic recording surface is, in principle, a two-dimensional (2-D) system. For example, grains on the media surface are not formed based on specific direction assumptions, and performance of the magnetic grains does not depend which direction is along-track and which direction is cross-track. Conventional magnetic recording systems generally constrain an inherently 2-D system to 1-D system in attempt to reduce system cost and complexity.

For example, a 1-D system utilizes individually accessed tracks, which allows for a single read head, single write head, and simplified controller functionality. As a result of this, a 1-D system attempts to minimize inter-track interference, which can increase decoding errors. In contrast, a 2-D system may be designed to assume that multiple tracks will be read at once. While a 2-D system may require more sophisticated decoding, it allows relaxing some constraints on erase bands, transducer width, etc.

In reference now to FIG. 1, a block diagram illustrates an example of reading 2-D tracks according to an example embodiment. The blocks (e.g., blocks 101-103) represent bits written in respective tracks 104-106 on a magnetic media surface 100. Although the blocks 101-103 are shown aligned to each other from track-to-track, this is not required. The arrows within the blocks represent magnetic orientations that will be sensed as ones or zeros by a reader, e.g., by read transducers 108 and/or 110. While two read transducers 108, 110 are shown, a similar effect may be achieved with two passes of a single read transducer, albeit with an increase in latency.

The read transducers 108, 110 may include magnetoresistive transducers, such as giant magnetoresistance (GMR) sensor, tunneling magnetoresistance (TMR) sensor, etc. Generally, these types of transducers include layers of magnetic and non-magnetic materials that change resistance in response to local magnetic fields. A current is passed through the sensor while the media moves underneath. The resulting signal is used to read bits on the tracks 104, 105.

The tracks 104-106 may be written by successive passes of a writer (not shown), e.g., forming shingled tracks by overlapping subsequent tracks during writing. In such a case, there may be limited erase bands between subsequent tracks 104-106. It will be understood that the embodiments described herein need not be limited to shingled tracks/media, and the concepts may be equally applicable to other track writing technologies, such as HAMR and BPM.

Generally, a width of the read transducers 108, 110 may be significantly wider than the tracks, such that the read transducers 108 will read signals from at least two adjacent tracks. For example, both read transducers 108 and 110 will read at least partially from both tracks 104 and 105. A TDMR device may use other read transducer arrangements. For example, read transducer 110 may be shifted down so as to cover track 105 fully and track 106 partially. More than two read transducers may be used, as indicated by transducer array 112. All of the transducers in array 112 are centered over the respective tracks 104-106, and therefore overlap two adjacent tracks.

Figure 2:
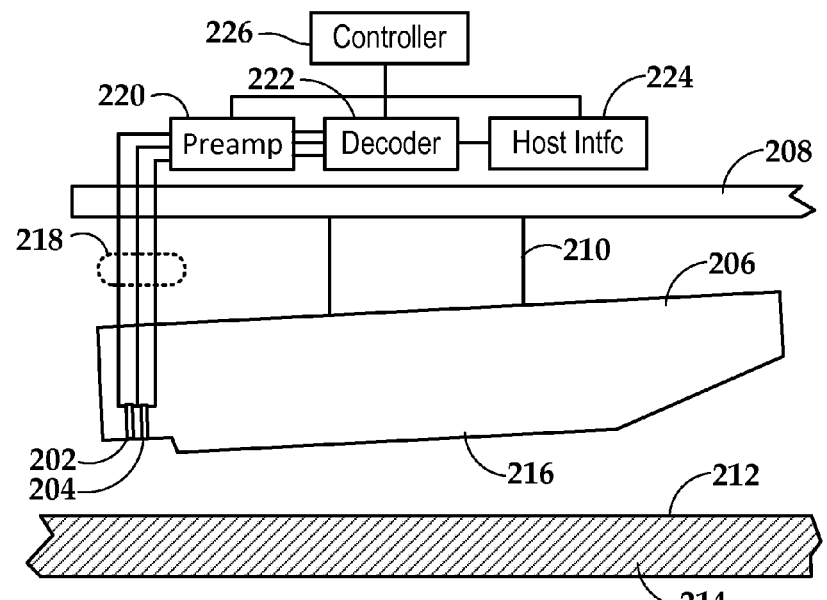
FIG. 2 is a block diagram of an apparatus according to an example embodiment.

The read transducers and media shown in FIG. 1 may be part of a hard disk data storage device. Details of such a device according to an example embodiment are shown in FIG. 2. Generally, read transducers 202, 204 are housed at a trailing edge of a slider 206, also sometimes referred to as a read/write head. The slider 206 is coupled to arm 208 by way of a suspension 210 that allows some relative motion between the slider 206 and arm 208. In addition to the read transducers 202, 204, the slider 206 may include one or more write transducers (not shown), such as a write pole and coil. When the slider 206 is located over surface 212 of a magnetic disk 214, a flying height is maintained between the slider 206 and surface 212 by a downward force of arm 208. This downward force is counterbalanced by an air cushion that exists between the surface 212 and an air bearing surface 216 of the slider 206 when the disk 214 is rotating.

Changes in local magnetic field caused by the moving disk 214 induce a change in resistance of the read transducers 202, 204. The read transducers are coupled to a preamplifier 220 by way of signal lines 218. Generally, the preamplifier 220 amplifies and conditions the analog signals (which may include a two-dimensional signal) received via signal lines 218, the amplified signals being used for other processing modules such as decoder 222. The decoder 222 determines a digital output from the analog signals, the digital output being used by a host via host interface 224, as well as other system components (not shown). The processing of the signals and data is generally managed by a controller 226, which may include a microprocessor and other logic circuits.

It should be noted that implementing the slider 206 with multiple readers may raise manufacturing difficulties. For example, space for signal and power lines is at a premium on the outer surface of the slider 206. This lack of space may be exacerbated by other enhancements in some embodiments, such as additional writers, heaters, HAMR laser, etc., any of which may require additional signal lines. It is therefore desirable to develop electronics to share one or more of the signal lines 218 between the multiple reader transducers 202, 204, therefore requiring fewer pads on the slider surface.

The preamplifier 220 applies a bias signal to the read transducers 202, 204 via the signal lines 218. The bias signal induces a current flow through read transducers 202, 204. Changes in voltage and/or current applied to the read transducers 202, 204 will be proportional to their resistance, which in turn are indicative of magnetic fields sensed by the read transducers 202, 204. In some configurations, it is desirable keep a relatively constant bias voltage on the read transducers 202, 204. This can ensure that the read transducers 202, 204 are at a desired operating point, which can be selected for optimum sensitivity, response linearity, etc. It is also desirable to minimize electrical potential between the read transducers 202, 204 and the surface 212 of the media 214 in order to minimize arcing, which can damage the read transducers 202, 204.

Figure 3:
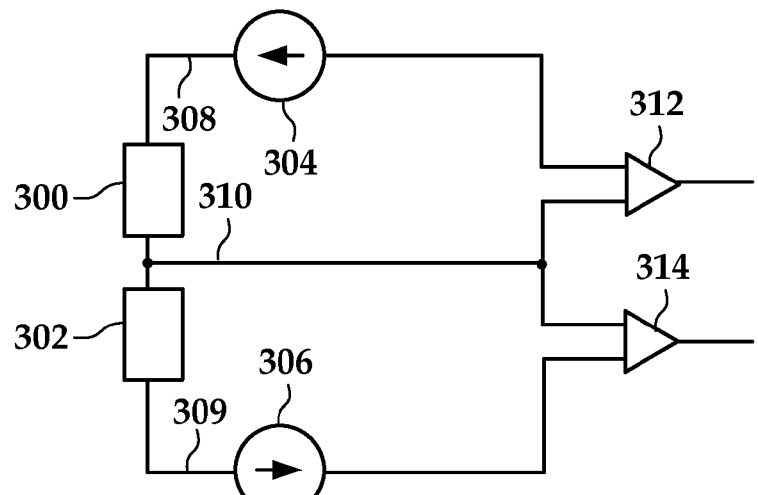
FIG. 3 is a block diagram of a preamplifier according to a first example embodiment.

In FIG. 3, a block diagram illustrates a read sensor arrangement according to a first example embodiment. Read sensors 300, 302 may be magnetoresistive sensors or the like, e.g., producing a varying resistance in response to strength and orientation of local magnetic fields. Current sources 304, 306 are coupled to respective first and second signal lines 308, 309 and maintain the same current through the sensors 300, 302 if there is no current flow through a common signal line 310 that is coupled between the sensors 300, 302. The signal lines 308-310 are coupled to amplifiers 312, 314 which amplify the signals across the respective sensors 300, 302.

The current sources 304, 306 are configured so that zero current flows through the common signal line 310. As such, voltages will change across each of the sensors 300, 302 in response to changing resistance, ensuring current through current sources 304, 306 remains constant. An overall voltage between first and second signal lines 308, 309 may remain constant. For example, if potential between lines 308 and 309 is $V_T$, then average voltage across sensor 300 would be $+V_T/2$ measured from first signal line 308 to common signal line 310. Average voltage across sensor 302 would be $-V_T/2$ measured from second signal line 309 to common signal line 310. Due to the manufacturing process limitations for matching the resistance of the sensors 300, 302, the actual voltage across each sensor may vary significantly. As will be discussed in greater detail below, this may have consequences as far as biasing the sensors 300, 302 or read back performance.

Figure 4:
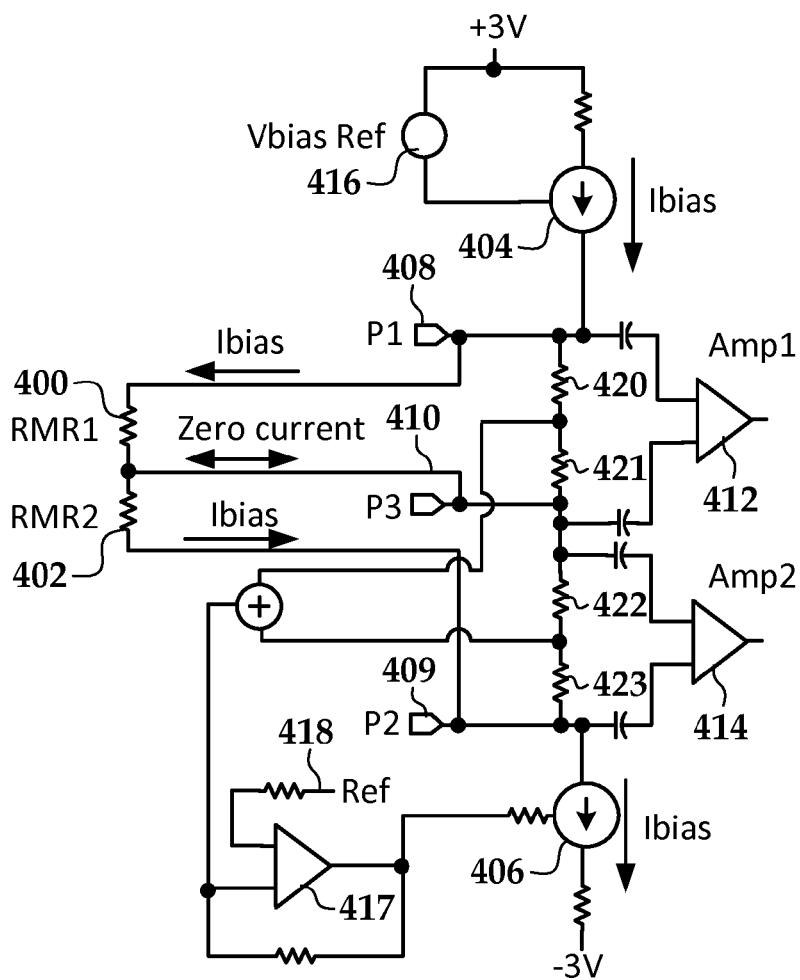
FIG. 4 is a schematic diagram of a preamplifier according to the first example embodiment.

In reference now to FIG. 4, a schematic diagram illustrates an example implementation of the first embodiment shown in FIG. 3. Read sensors 400, 402 (e.g., magnetoresistive sensors or the like) are represented as resistors. Transistors 404, 406 are configured as current controllers that provide a constant current ($I_{bias}$) through the series-coupled read sensors 400, 402. The constant current flows through first and second signal lines 408, 409, and zero current flows through common signal line 410. The signal lines 408-410 are coupled to first and second output amplifiers 412, 414.

The first current source transistor 404 is driven by a constant reference voltage source 416. The second current source transistor 406 is driven by an amplifier 417 that takes as inputs a reference voltage 418 and an average voltage across each of the sensors 400, 402. The average voltage is obtained by resistors 420-423. Resistors 420-423 are voltage dividers that respectively estimate a mid-point voltage across sensors 400, 402, the mid-point voltages being sent to an adder 424. The adder 424 sends the arithmetic sum of the mid-point voltages to the input of amplifier 417.

As previously noted, the use of a constant current to drive sensors 400, 402 means that the voltage across the sensors will change proportional to resistance changes of the sensors 400, 402. This may cause one or both of the sensors 400, 402 to be over biased or under biased during operation. This may also cause a common mode voltage for the individual sensors to deviate considerably from the desired value.

Figure 8:
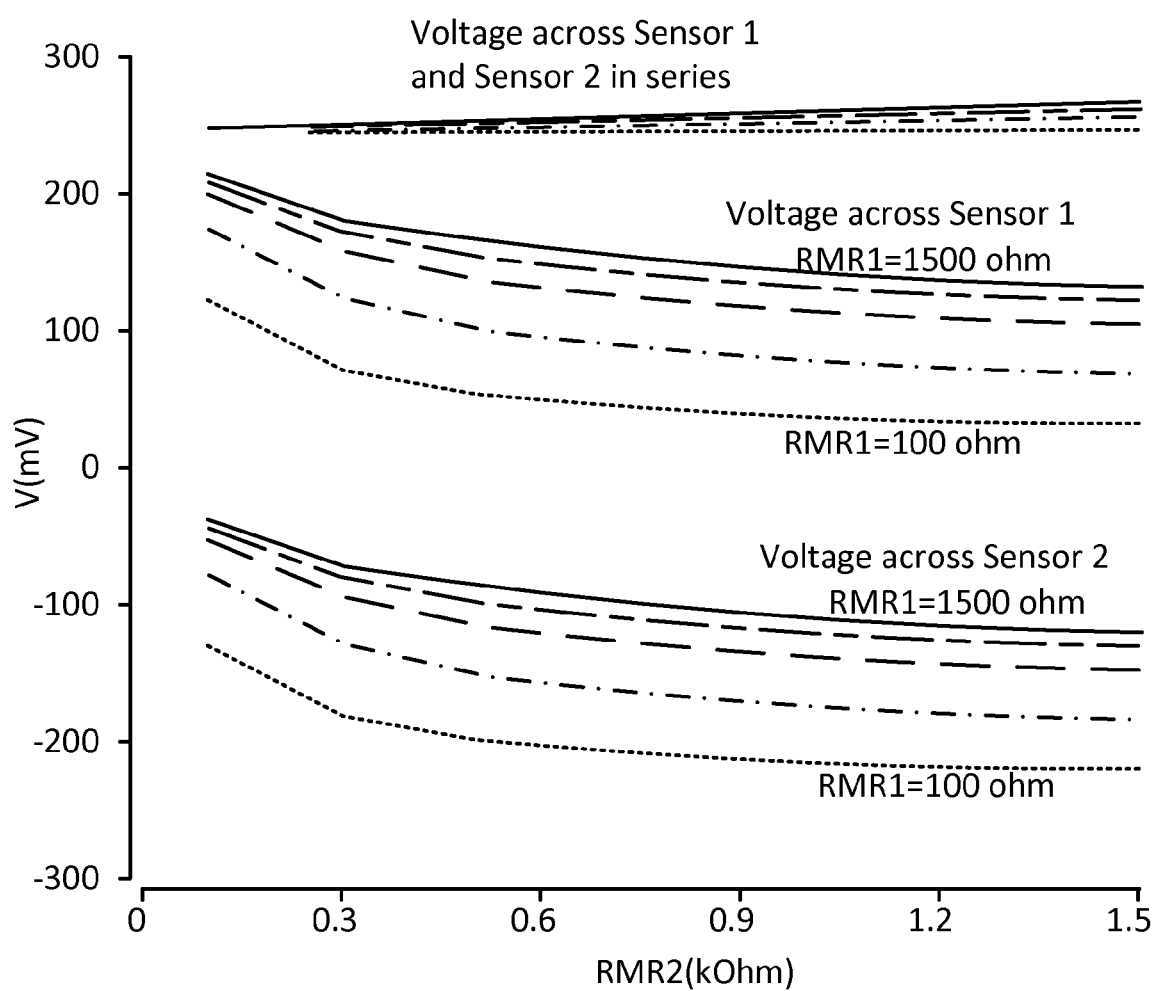
FIG. 8 is a graph of sensor bias voltages obtained from a simulation of the first example embodiment.

A simulation of the circuit shown in FIG. 4 was run with a desired 125 mV being applied across each sensor and with both sensors (RMR1 and RMR2) being varied between 100 ohms and 1500 ohms each. The result of the simulation is shown in the graph of FIG. 8. While the total voltage across the sensors 400, 402 is relatively constant, the individual voltage across each of the sensors varies significantly. Thus the circuit shown in FIG. 4 may be less than ideal if the optimum biasing voltage range (e.g., one that results in minimal bit error rate) is a smaller range than shown in FIG. 8, and may also expose the sensors to an increased risk for arcing to the disc.

Figure 5:
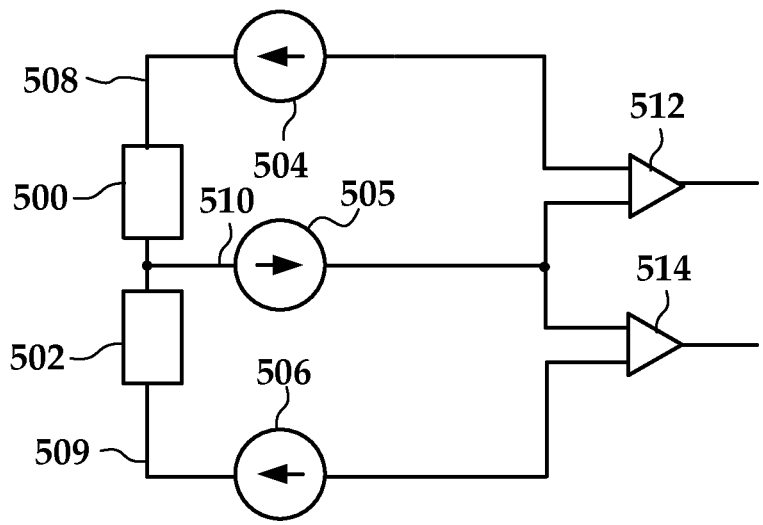
FIG. 5 is a block diagram of a preamplifier according to a second example embodiment.

An alternate approach is shown in FIG. 5, where a block diagram illustrates a read sensor bias arrangement according to a second example embodiment. Read sensors 500, 502 (e.g., magnetoresistive sensors or the like) are coupled to respective first and second signal lines 508, 509. Current sources 504-506 independently maintain a current through the sensors 500, 502. A common signal line 510 is coupled between the sensors 500, 502. The current source 505 provides a current sink equal to the sum of the currents from sources 504 and 506. The signal lines 508-510 are coupled to amplifiers 512, 514 which amplify the signals across the respective sensors 500, 502.

The current sources 504, 506 may be independently set to obtain the desired bias value across each of the sensors 500, 502, regardless of the resistance value of each sensor 500, 502. This bias value may be a fixed bias voltage or a fixed bias current. In one arrangement, the bias voltage is fixed and so the bias voltage for a given sensor resistance will not depend on the resistance value of the other sensor. In another arrangement, the current sources 504, 506 may be independently set to obtain the desired current through each of the sensors 500, 502, regardless of the resistance value of each sensor 500, 502. For a given sensor resistance, this bias current will be fixed and will not depend on the resistance value of the other sensor. For purposes of this disclosure, a "fixed" voltage and/or current is one that generally does not vary outside of a small and/or predetermined range, e.g., a 5-10% or less variance under normal operating conditions.

Figure 6:
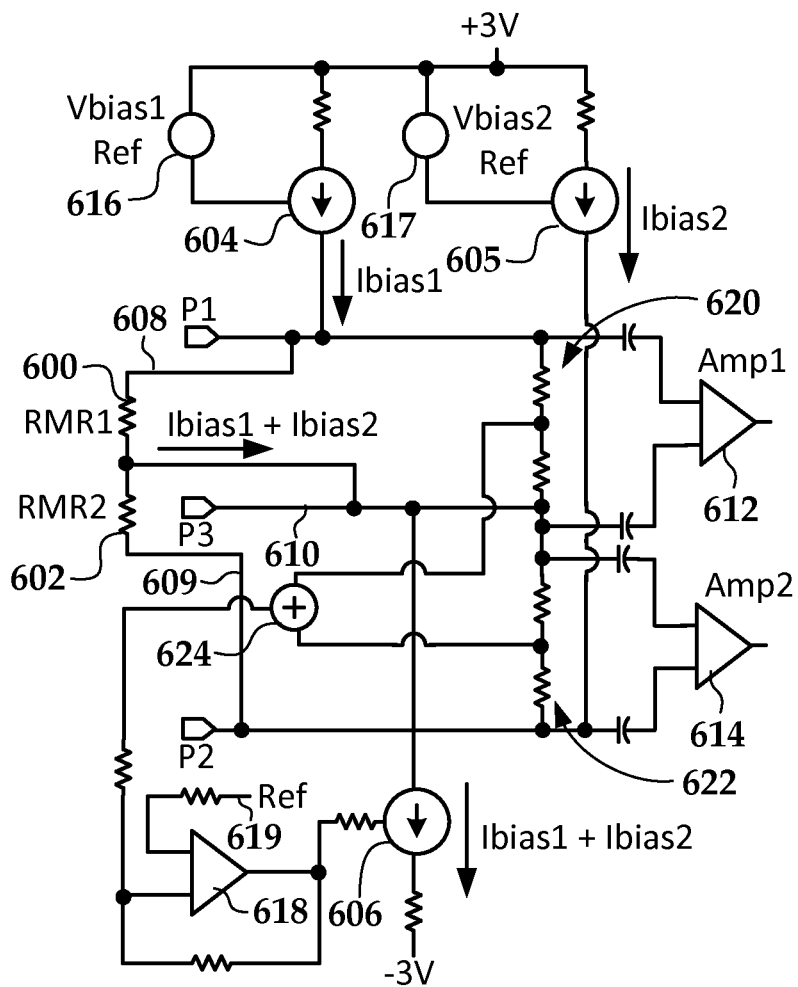
FIG. 6 is a schematic diagram of a preamplifier according to the second example embodiment.

In FIG. 6, a circuit diagram illustrates an example for a constant current bias implementation of the second embodiment shown in FIG. 5. Read sensors 600, 602 (e.g., magnetoresistive sensors or the like) are represented as resistors. Current controllers 604, 605 (e.g., transistors) provide currents ($I_{bias1}$, $I_{bias2}$) flowing through the read sensors 600, 602 via first and second signal lines 608, 609. A sum of the currents ($I_{bias1}+I_{bias2}$) flows through common signal line 610. A third current controller 606 regulates the current through the common signal line 610. The third current controller 606 maintains an average potential across the read sensors 600, 602, and can be configured to minimize the difference between this average potential and the reference voltage 619 regardless of a mismatch in sensor resistance. The reference voltage 619 may be set to a predetermined value, e.g., equal to the electrical potential of a magnetic media that is read by the read sensors 600, 602. The signal lines 608-610 are coupled to first and second output amplifiers 612, 614.

The first and second current controllers 604, 605 are driven by constant reference voltage sources 616, 617. The third current source controller 606 is driven by an amplifier 618 that takes as inputs a reference voltage 619 and an average voltage across the sensors 600, 602. The average voltage is obtained by voltage dividers 620, 622. The voltage dividers 620, 622 are coupled in parallel to the sensors 600, 602, and respectively estimate a mid-point voltage across sensors 600, 602, the mid-point voltages being sent to an adder 624. The adder 624 sends the arithmetic sum of the mid-point voltages to the input of amplifier 618.

Figure 7:
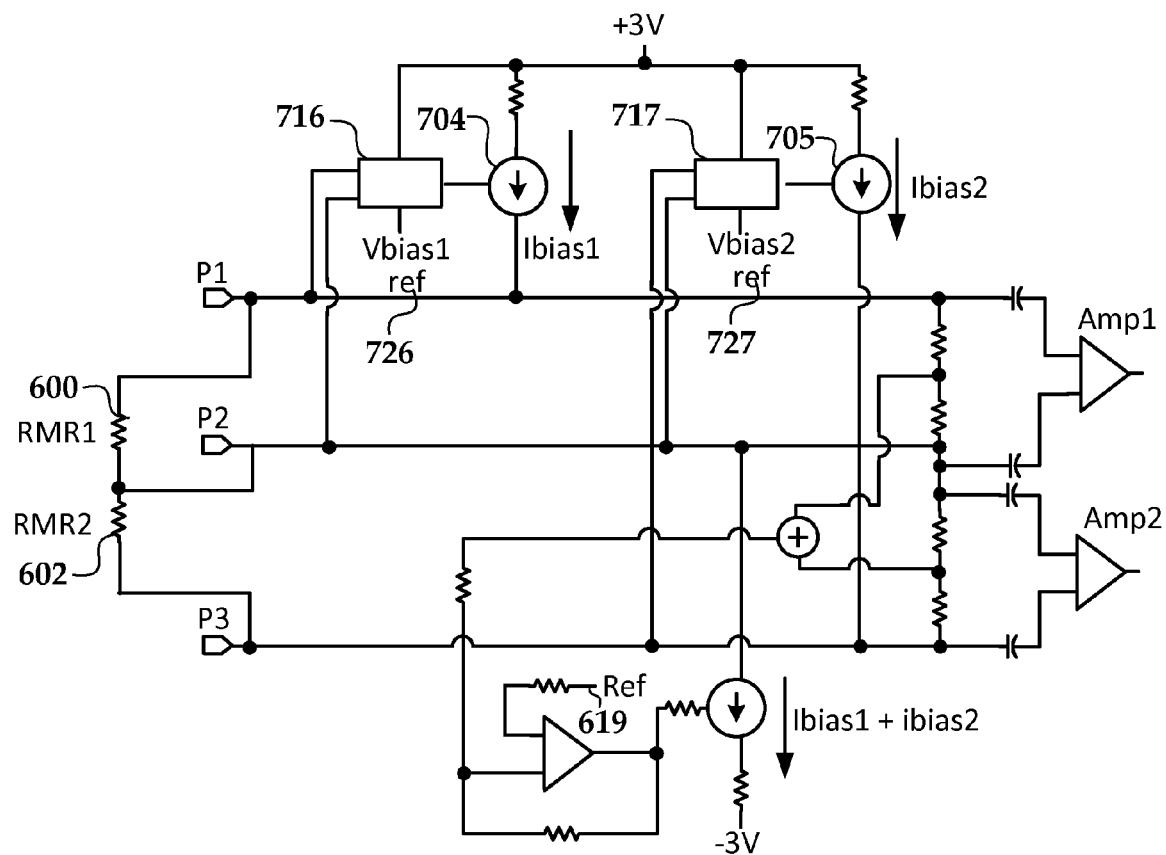
FIG. 7 is a schematic diagram of a preamplifier according to a third example embodiment.

In contrast to the first embodiments shown in FIGS. 4 and 5, the embodiments in FIGS. 6 and 7 facilitate maintaining a constant bias voltage on the sensors 600, 602 over a wide range of sensor resistance and mismatch. A simulation of the circuit shown in FIG. 4 was run with a bias voltage across the first sensor 600 (RMR1) being set to 125 mV and bias voltage of the second sensor 602 (RMR2) being set to 150 mV. The reference voltage 619 is set to ground. The resistance of the sensors 600, 602 was swept from 100 ohm to 1500 ohm. The result of the simulation is shown in the graphs of FIGS. 9A and 9B.

Figure 9A:
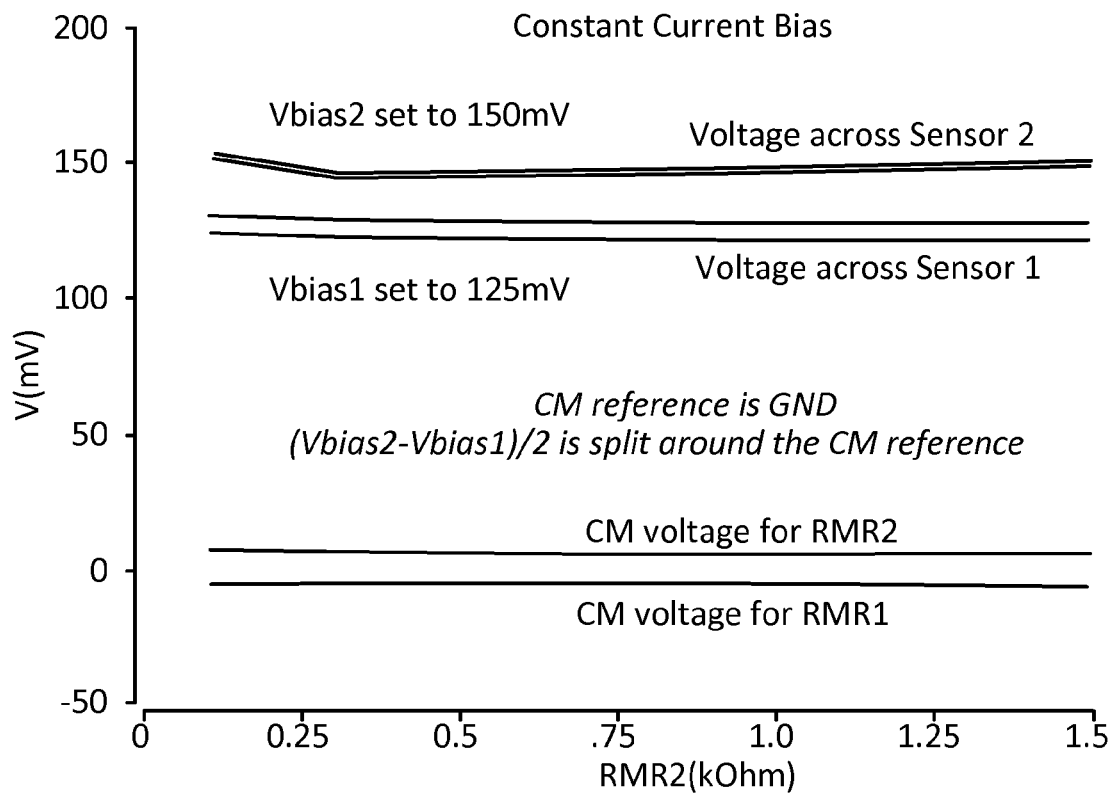
FIGS. 9A and 9B are is graphs of sensor bias voltages obtained from simulations of the second example embodiment.

In FIG. 9A, the individual voltages across the sensors 600, 602 are confined to relatively small ranges along the Y-axis, illustrating the reduced sensitivity to sensors resistance mismatch. Furthermore, the common mode voltage of the sensors 600, 602 (measured at a mid-point of each sensor) is maintained at a value equal to (VMR1−VMR2)/4 away from the reference voltage 619 either in the positive, or the negative direction pending on the relative magnitude of VMR1 and VMR2. In other words, half of the voltage bias difference is equally split around the reference 619. This provides a means to reduce the risk for arcing between sensors and media.

Figure 9B:
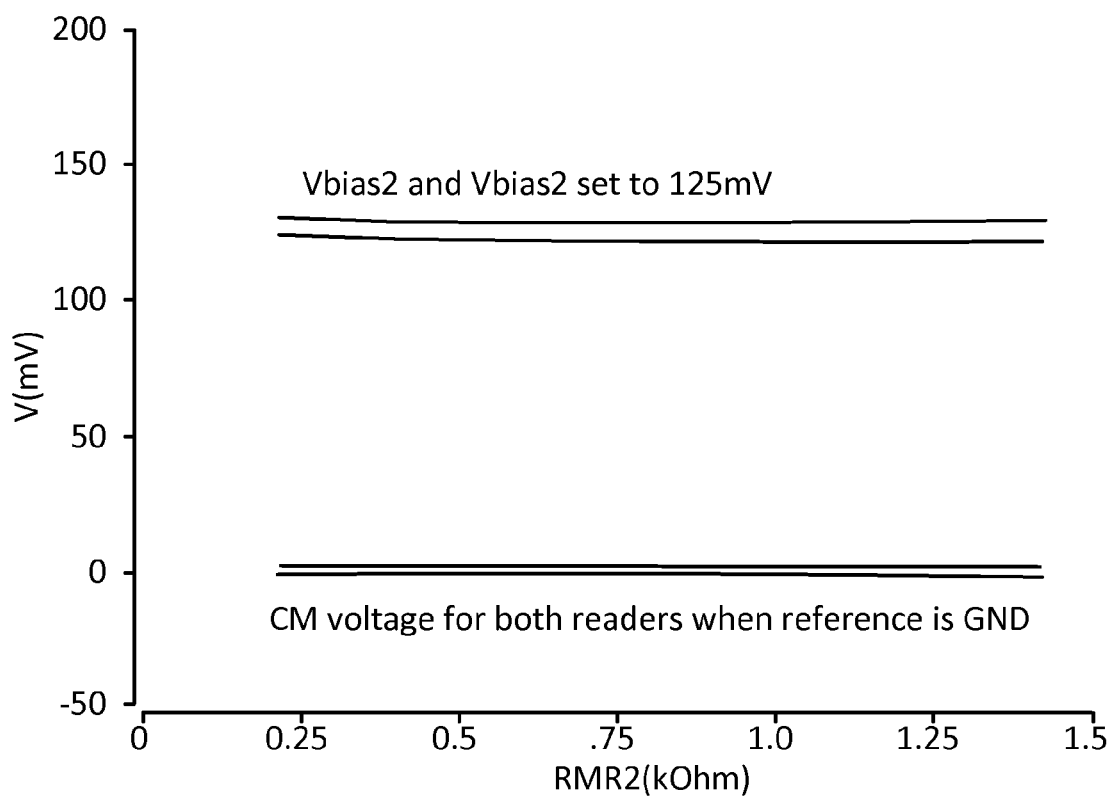

In FIG. 9B, the bias voltages across the first sensor 600 (RMR1) and second sensor 602 (RMR2) are both set to 125 mV. The common mode voltages of the sensors 600, 602 are referenced to ground. Again, the bias voltage across each sensor 600,602 is confined to a small range for a wide range of sensor resistance values. In this case, the common mode voltage of both sensors is about zero, because VMR1=VMR2, so (VMR1−VMR2)/4=0.

In reference now to FIG. 7, a circuit diagram illustrates another implementation of the second embodiment from FIG. 5. The arrangement of the circuit is similar to that of FIG. 6, except that FIG. 7 shows an example implementation of a constant voltage bias method. In this implementation, circuits 716, 717 compare the voltage across sensors 600, 602 against the programmed bias voltage 726, 727. In response to this comparison, the circuits 716, 717 drive current sources 704, 705 until the actual bias across the sensors matches the programmed value.

Figure 10:
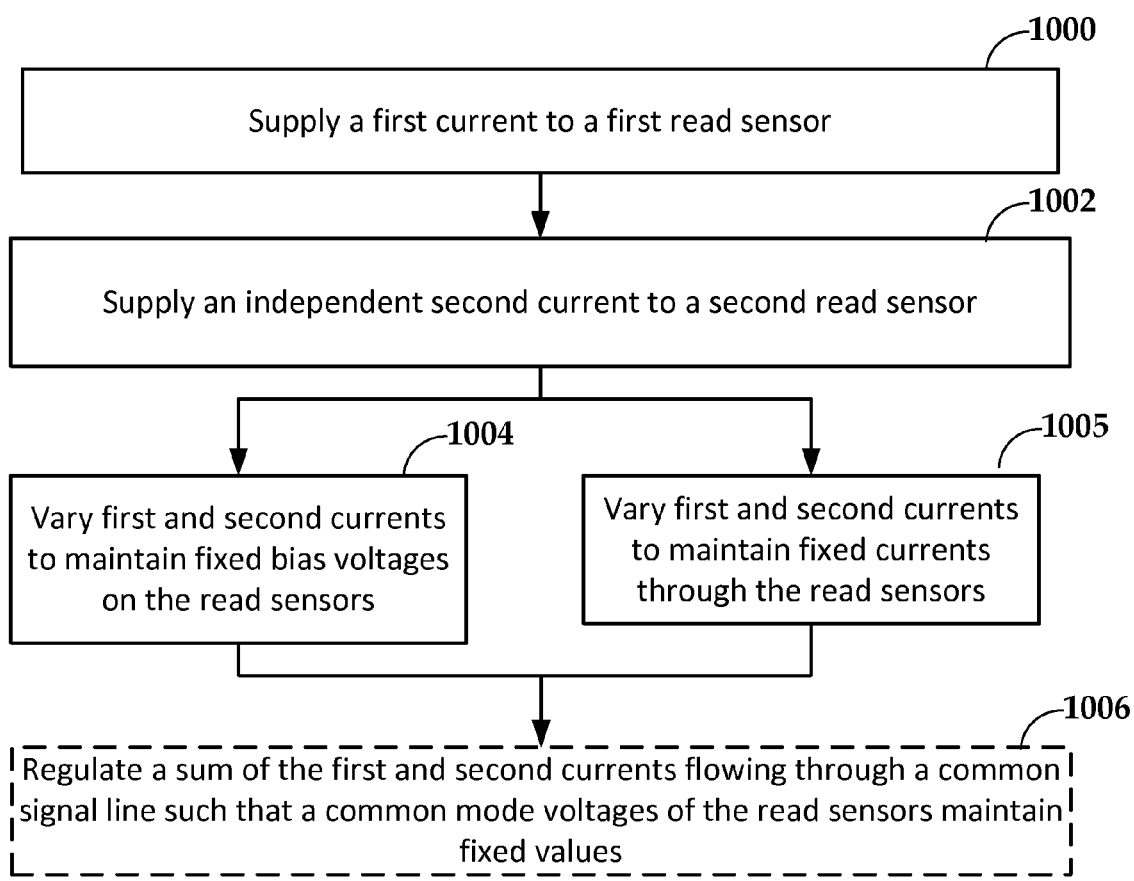
FIG. 10 is a flowchart illustrating a method according to an example embodiment.

It will be understood that the illustrated circuits may be varied while providing equivalent or similar functionality. For example, a variety of current/voltage control elements (e.g., field-effect transistors, bipolar junction transistors, integrated circuits) may be used current controllers shown in FIGS. 4, 6, and 7. Similarly, values such as supply voltages, polarity, current flow, etc. may be different than that illustrated. Alternate voltage dividers (e.g., integrated circuits) may be used instead of the illustrated resistors. The connectivity between the sensors and the gain stage could have other implementations In reference now to FIG. 10, a flowchart illustrates a method according to an example embodiment. The method is used in an apparatus with first and second read sensors (e.g., magnetoresistive sensors) coupled in series to a preamplifier via respective first and second signal lines and a common signal line between the sensors. The method involves supplying 1000 a first current to the first read sensor and supplying 1002 an independent second current to the second read sensor. The first and second currents are varied 1004 to either maintain first and second fixed bias voltages on the read sensors as in block 1004, or maintain first and second fixed bias currents through the read sensors as in block 1005. The method may also involve regulating 1006 a sum of the first and second currents flowing through the common signal line to maintain a common mode voltage on the first and second read sensors to a fixed value, e.g., one that does not deviate from the chosen reference by more than (VMR1−VMR2)/4 regardless of the sensors resistance mismatch.

Figure 11:
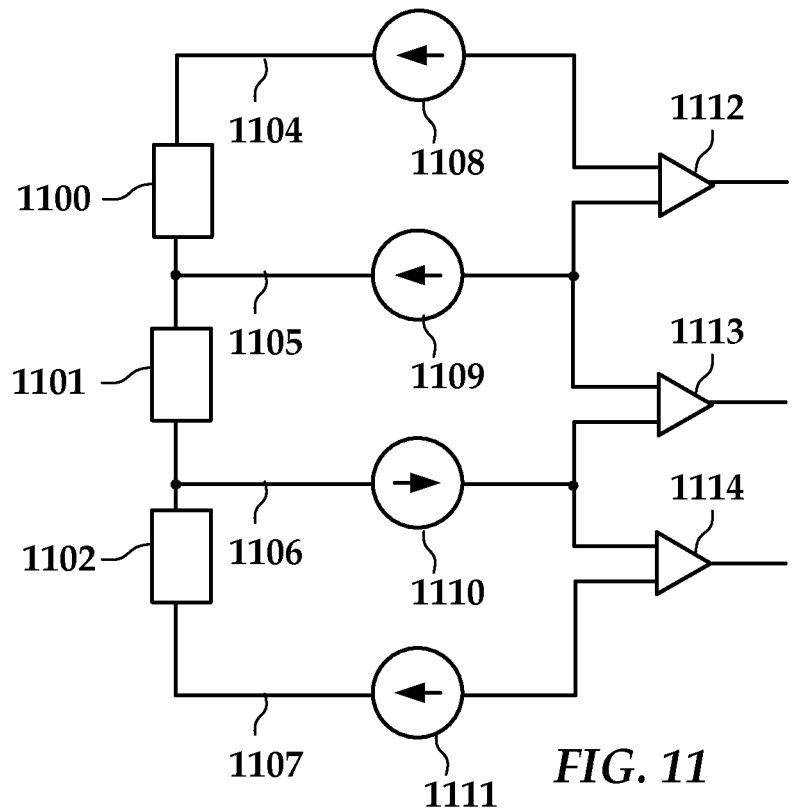
FIGS. 11 and 12 are block diagrams of a preamplifier coupled to more than two read sensors according to example embodiments.

It will be understood that the circuits described herein may be extended to more than two read sensors. In FIG. 11, a block diagram illustrates an arrangement having more than two read sensors according to an example embodiment. Read sensors 1100-1102 (e.g., magnetoresistive sensors or the like) are coupled to respective signal lines 1104-1107, of which 1105 and 1106 are common signal lines. Current sources 1108-1111 independently maintain currents through the sensors 1100-1102. The current source 1110 provides a current sink equal to the sum of the currents from sources 1108, 1109, and 1110. In other arrangements, both current sources 1109 and 1110 may be sinks equal to the sums of sources 1108 and 1111. The signal lines 1104-1107 are coupled to amplifiers 1112-1114, which amplify the signals across the respective sensors 1100-1102.

The current sources 1104-1107 may be independently set to obtain the desired bias value (e.g., fixed bias voltage or fixed bias current) across each of the sensors 1100-1102, regardless of the resistance value of each sensor 1100-1102. The value of the return current through source 1109 (and 1110 if configured as a sink) may be adjusted to ensure a desired voltage across the sensors 1101-1102, e.g., to minimize a potential between the sensors and a media. The current directions may be reversed from what is shown in FIG. 11, and in other variations described above regarding FIG. 11.

Figure 12:
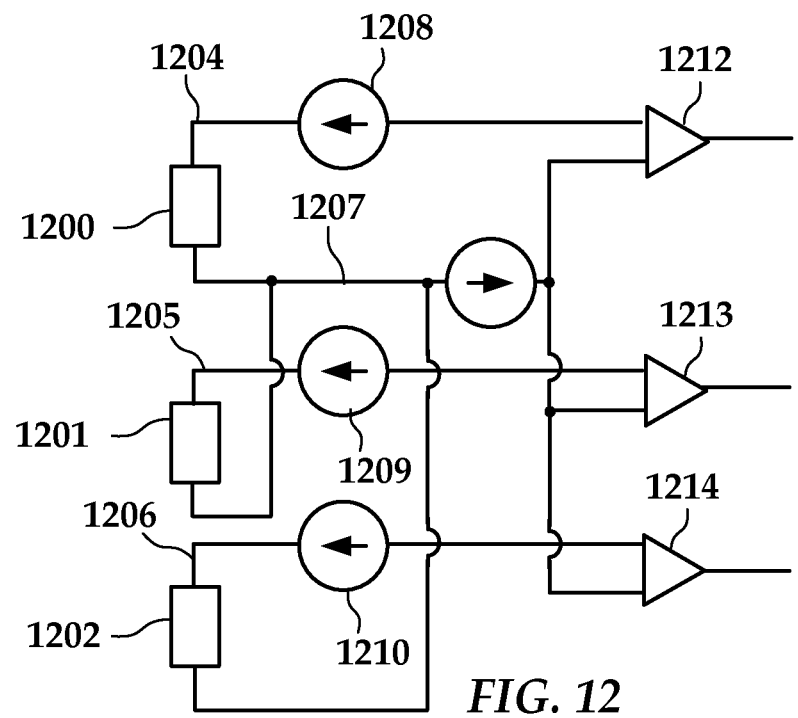

In FIG. 12, a block diagram illustrates an arrangement having more than two read sensors according to an example embodiment. Read sensors 1200-1202 (e.g., magnetoresistive sensors or the like) are coupled to respective signal lines 1204-1207. One side of the each sensor 1200-1202 is coupled to a common signal line 1207. Current sources 1208-1210 independently maintain currents through the sensors 1200-1202. Current source 1211 provides a current sink equal to the sum of the currents from sources 1208-1210. The signal lines 1204-1207 are coupled to amplifiers 1212-1214, which amplify the signals across the respective sensors 1200-1202.

The current sources 1204-1207 may be independently set to obtain the desired bias value (e.g., fixed bias voltage or fixed bias current) across each of the sensors 1200-1202, regardless of the resistance value of each sensor 1200-1202. The value of the return current through source 1211 may be adjusted to ensure a desired voltage across the sensors 1201-1202, e.g., to minimize a potential between the sensors and a media. The current directions may be reversed from what is shown in FIG. 12.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to facilitate managing caching in data storage devices as described above.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A method comprising:
coupling first and second read sensors in series to a preamplifier via respective first and second signal lines and a common signal line between the first and second read sensors;
supplying independent first and second currents to the respective first and second read sensors, the first and second currents being varied to maintain respective first and second fixed bias values on the first and second read sensors
supplying a third current coupled to the common signal line to regulate a sum of the first and second currents to maintain respective common mode voltages for the first and second read sensors regardless of a resistance mismatch between the first and second read sensors; and
adding to provide a sum of first and second mid-point voltages of the first and second read sensors, the sum being used to control the third current.

2. The method of claim 1, wherein the first and second fixed bias values comprise first and second fixed bias currents.

3. The method of claim 1, wherein the first and second fixed bias values comprise first and second fixed bias voltages.

4. The method of claim 1, wherein the first and second read sensors comprise magnetoresistive sensors.

5. The method of claim 1, further comprising reading a two-dimensional magnetic recording signal responsive to the first and second currents.

6. The method of claim 1, further comprising regulating a sum of the first and second currents flowing through the common signal line to minimize a difference between common mode voltages of the first and second read sensors and an electrical potential of a magnetic media that is read by the first and second read sensors.

7. A preamplifier comprising:
a common signal line capable of being coupled between first and second read sensors;
first and second signal lines capable of being coupled to respective ends of the first and second read sensors;
first and second current controllers that independently supply first and second currents respectively to the first and second read sensors, the first and second currents being varied to maintain respective first and second fixed bias values on the first and second read sensors;
a third current controller coupled to the common signal line that regulates a sum of the first and second currents to maintain respective common mode voltages for the first and second read sensors regardless of a resistance mismatch between the first and second read sensors; and
an adder that provides a sum of first and second mid-point voltages of the first and second read sensors, the sum being used to control the third current controller.

8. The preamplifier of claim 7, wherein the first and second fixed bias values comprise first and second fixed bias currents or first and second fixed bias voltages.

9. The preamplifier of claim 7, further comprising first and second amplifiers respectively coupled across the first and second read sensors.

10. The preamplifier of claim 7, wherein the first and second read sensors are series-connected.

11. The preamplifier of claim 7, wherein the common mode voltages are maintained to minimize a difference between the common mode voltages and an electrical potential of a magnetic media that is read by the first and second read sensors.

12. A system comprising:
a read head comprising first and second read sensors coupled in series at a common signal line, first and second signal lines being coupled to the respective other ends of the first and second read sensors;
a preamplifier coupled to the common signal line and first and second signal lines, the preamplifier independently supplying first and second currents respectively to the first and second read sensors, the first and second currents being varied to maintain respective first and second fixed bias voltages or first and second fixed bias currents on the first and second read sensors;
a current controller coupled to the common signal line that regulates a sum of the first and second currents to maintain respective common mode voltages for the first and second read sensors regardless of a resistance mismatch between the first and second read sensors; and
an adder providing a sum of the first and second mid-point voltages, the sum being used to control the current controller.

13. The system of claim 12, further comprising a third read sensor coupled to a third signal line that is coupled to the preamplifier, the preamplifier independently supplying a third current to the third read sensor, the third current being varied to maintain a third fixed bias voltage or third fixed bias currents on the third read sensor.

14. The system of claim 13, wherein the third read sensor is coupled to the common signal line, a sum of the first, second, and third currents flowing through the common signal line.

15. The system of claim 13, wherein the second signal line comprises a second common signal line between the third read sensor and the second read sensor.

16. The system of claim 12, further comprising a magnetic media being that is read by the read head, the magnetic media comprising shingled tracks.

17. The system of claim 12, further comprising a decoder receiving a two-dimensional magnetic recording signal from the preamplifier.

18. A system comprising:
a read head comprising first and second read sensors coupled in series at a common signal line, first and second signal lines being coupled to the respective other ends of the first and second read sensors;
a preamplifier coupled to the common signal line and first and second signal lines, the preamplifier independently supplying first and second currents respectively to the first and second read sensors, the first and second currents being varied to maintain respective first and second fixed bias voltages or first and second fixed bias currents on the first and second read sensors; and
a third read sensor coupled to a third signal line that is coupled to the preamplifier, the preamplifier independently supplying a third current to the third read sensor, the third current being varied to maintain a third fixed bias voltage or third fixed bias currents on the third read sensor and wherein the second signal line comprises a second common signal line between the third read sensor and the second read sensor.

* * * * *